United States Patent

Katooka et al.

[11] Patent Number: 5,726,416
[45] Date of Patent: Mar. 10, 1998

[54] AIR PLASMA ARC CUTTER

[75] Inventors: Masao Katooka, Kawanishi; Toshihide Tokuda, Takatsuki; Takashi Hashimoto, Kobe; Kunio Karino, Suita, all of Japan

[73] Assignee: Sansha Electric Manufacturing Company, Limited, Osaka, Japan

[21] Appl. No.: 736,153

[22] Filed: Oct. 24, 1996

[51] Int. Cl.⁶ .................................. B23K 10/00
[52] U.S. Cl. .................. 219/121.48; 219/121.39; 219/121.36
[58] Field of Search .............. 219/121.36, 121.39, 219/121.44, 121.48, 121.45, 137 PS, 132, 133, 130.1, 137 R

[56] References Cited

U.S. PATENT DOCUMENTS

| | | | |
|---|---|---|---|
| 3,567,902 | 3/1971 | Stearns et al. | 219/132 |
| 4,027,125 | 5/1977 | Peek et al. | 200/148 R |
| 4,142,091 | 2/1979 | Biethan, Sr. | 219/131 R |
| 4,591,683 | 5/1986 | Eke | 219/10.55 B |
| 4,902,226 | 2/1990 | Elliott et al. | 433/104 |
| 5,041,710 | 8/1991 | Hamal | 219/70 |

FOREIGN PATENT DOCUMENTS

| | | |
|---|---|---|
| 0 003 482 A | 8/1979 | European Pat. Off. |
| 2555605 | 12/1988 | Japan |
| 6-38985 | 5/1994 | Japan |
| 1 457 438 | 12/1976 | United Kingdom |

*Primary Examiner*—Mark H. Paschall
*Attorney, Agent, or Firm*—Duane, Morris & Heckscher LLP

[57] ABSTRACT

An air plasma arc cutter includes spaced apart front and rear panels. A partition wall has its opposed two edges coupled to the front and rear panels to divide the space therebetween into upper and lower regions. An AC-to-DC voltage converter is disposed in the upper region and converts an AC voltage to a DC voltage to be applied between a torch electrode of a torch of the cutter and a workpiece. An air compressor supplies compressed air around the torch electrode and is disposed in the lower region. The air compressor has a threaded bolt which extends through the partition wall from the lower into upper regions. A nut is screwed onto the bolt in the upper region to thereby secure the air compressor to the partition wall. Shock absorbing members are disposed between the nut and the partition wall and between the air compressor and the partition wall.

3 Claims, 2 Drawing Sheets

AIR PLASMA ARC CUTTER

This invention relates to an air plasma arc cutter which cuts a workpiece by a air plasma generated by a high DC voltage, and, more particularly, to such an air plasma arc cutter with compressed air supplied from an air compressor built in the cutter.

BACKGROUND OF THE INVENTION

In an air plasma arc cutter, an AC voltage is converted to a high DC voltage by an AC-to-DC voltage converter circuit. The high DC voltage is applied between a torch of the cutter and a workpiece which is an object to be cut by the cutter. The application of the DC voltage causes an arc to be generated between the torch and the workpiece. An air compressor supplies compressed air around the torch and into a gap between the torch and the workpiece. The arc ionizes the compressed air into plasma, and the workpiece is cut by the plasma.

Japanese Examined Patent Publication (KOKOKU) No. HEI 6-38985 discloses an air plasma arc cutter including an air compressor and an AC-to-DC voltage converter housed in a single casing. This can reduce the size of the cutter.

An air compressor generates a large amount of heat when it is operating. An AC-to-DC voltage converter generates a small amount of heat relative to the air compressor. Accordingly, it is necessary to avoid interaction of heat generated by the air compressor and the voltage converter.

Because of difference in amount of heat generated, the amounts of air to be blown to cool the air compressor and the voltage converter differ from each other.

In addition, the air compressor produces significant vibrations when it is operating. Therefore some measures must be taken against such vibrations.

SUMMARY OF THE INVENTION

An air plasma arc cutter according to the present invention includes front and rear panels spaced from each other. Opposed ends of a partition wall are coupled to the front and rear panels. The partition wall partitions the space defined between the front and rear panels into first and second regions. AC-to-DC voltage converting means is disposed in the first region. The voltage converting means converts an AC voltage to a DC voltage which is applied between a torch electrode of a torch of the air plasma arc cutter and a workpiece to be cut. Air compressor means is disposed in the second region. The air compressor means supplies compressed air around the torch electrode of the torch.

The air compressor means may be provided with a bolt which extends from the second region through the partition wall into the first region. A nut is screwed onto the bolt in the first region to secure the air compressor means to the partition wall. The partition wall desirably has such strength as to bear the weight of the air compressor means. A first shock absorbing member is disposed between the nut and the partition wall, and a second shock absorbing member is disposed between the air compressor means and the partition wall.

The first and second shock absorbing members may be disposed around the bolt. The first and second shock absorbing members may be ring-shaped so that the bolt can extend through the absorbing members.

The first region may be on the upper side of the partition wall with the second region being on the lower side.

DESCRIPTION OF AN PREFERRED EMBODIMENT

Figure 1:
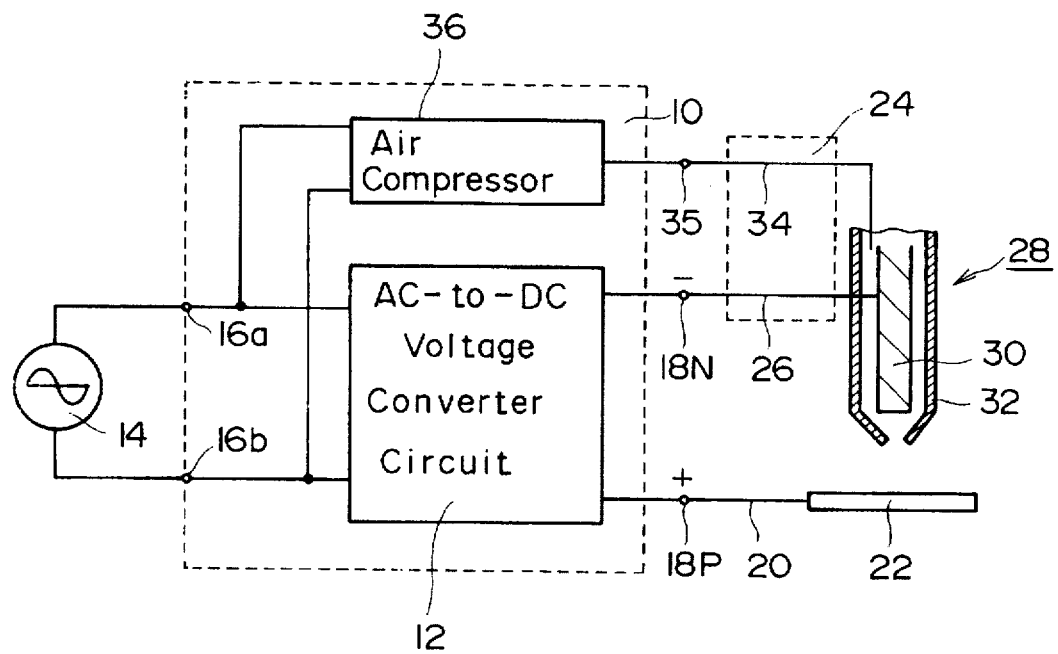
FIG. 1 is an electrical block diagram of an air plasma arc cutter according to one embodiment of the present invention.

As shown in FIG. 1, an air plasma arc cutter 10 according to the present invention includes an AC-to-DC voltage converter circuit 12. The AC-to-DC voltage converter circuit 12 converts a commercial AC voltage supplied from a commercial AC voltage supply 14 between power supply terminals 16a and 16b to a DC voltage, which is developed between a plus (+) output terminal 18P and a minus (−) output terminal 18N. For that purpose, the AC-to-DC converter circuit 12 includes a converter, which may comprise a rectifying and smoothing circuit (not shown), for converting the input AC voltage to a DC voltage. The resulting DC voltage is coupled to a high frequency inverter (not shown) in the circuit 12, where it is converted to a high frequency voltage. The high frequency voltage is, then, applied across a primary winding of a transformer (not shown) in the circuit 12, which induces a voltage boosted version of the high frequency voltage across a secondary winding of the transformer.

The boosted high frequency-high voltage is then converted to the ultimate DC voltage by another converter, e.g. a rectifying and smoothing circuit (not shown) in the circuit 12, which voltage is developed between the output terminals 18P and 18N of the AC-to-DC converter circuit 12.

The plus output terminal 18P is connected to a workpiece 22 to be cut through a power supply cable 20. The minus output terminal 18N is connected to a torch electrode 30 of a cutter torch 28 through a power supply cable 26 in a composite cable 24.

The torch 28 includes a cup or sheath 32 disposed around the torch electrode 30 with a spacing disposed therebetween. Compressed air is supplied into the spacing between the torch electrode 30 and the cup 32 from an air compressor 36 via an air port 35 and air tubing 34 in the composite cable 24. The compressed air jets toward the workpiece 22 through the opening at the tip end (i.e. the end facing the workpiece 22) of the cup 32.

Because of the DC voltage applied between the torch electrode 30 and the workpiece 22, an arc is generated between them, and, the arc, in turn, ionizes the compressed air into plasma. The plasma is jetted onto the workpiece 22, and the workpiece 22 is cut.

Figure 2:
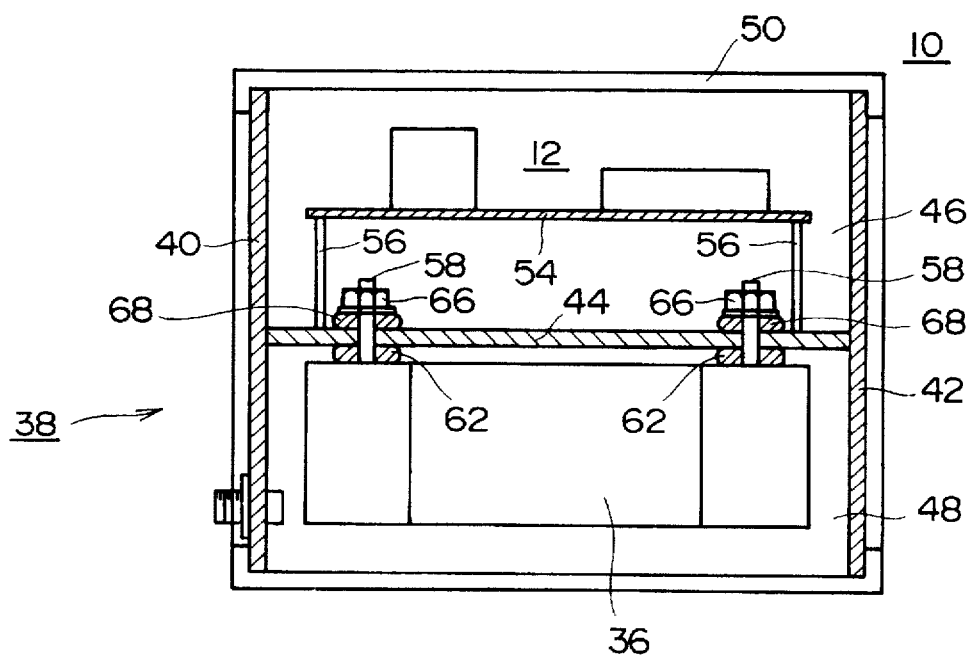
FIG. 2 is a cross-sectional side view of the air plasma arc cutter shown in FIG. 1.

Referring to FIG. 2, the AC-to-DC converter circuit 12 and the air compressor 36 are disposed in a casing 38 of the air plasma arc cutter 10. The air compressor 36 is also driven from the commercial AC voltage supply 14.

Figure 3:
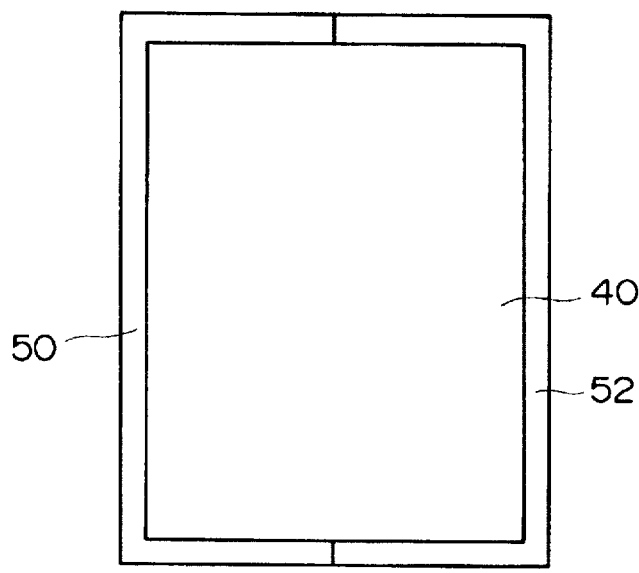
FIG. 3 is a front elevational view of the air plasma arc cutter shown in FIG. 2.

As shown in FIGS. 2 and 3, the casing 38 includes a generally rectangular front panel 40, and a rear panel 42 spaced from the front panel 40. The shape of the rear panel 42 is generally the same as that of the front panel 40. The front and rear panels may be made of synthetic resin.

The space defined by the front and rear panels 40 and 42 between them is partitioned by a partition wall 44 into two regions, for example, an upper region 46 and a lower region 48. For that purpose, the partition wall 44 may be generally rectangular in its plan, and has its two opposite edges connected to the front and rear panels 40 and 42 at a location intermediate between top and bottom edges of the front and rear panels 40 and 42. The partition wall 44 may be a strong plate member, e.g. an iron plate.

As shown in FIG. 3, members 50 and 52 having a generally U-shaped cross-section are disposed to cover the respective sides of the space between the front and rear panels 40 and 42 to form the casing 38. The respective upper and lower edges of each of the U-shaped members 50 and 52 abut the upper and lower edges of the other of the members 50 and 52, respectively, along lines intermediate the sides of the casing 38. The members 50 and 52 may be formed of synthetic resin.

Although not shown in the drawings, the plus output terminal 18P is mounted on the front panel 40, and a connector assembly comprising the minus output terminal 18N and the air port 35 is also disposed on the front panel 40. The composite cable 24 is connected to the connector assembly. The power supply terminals 16a and 16b are mounted on the rear panel 42.

The AC-to-DC voltage converter circuit 12 is disposed in the upper region 46. The AC-to-DC converter circuit 12 is arranged on, for example, a printed circuit board 54. The printed circuit board 54 is supported on the partition wall 44 with a plurality of spacers 56 which are disposed between the printed circuit board 54 and the partition wall 44. In the illustrated embodiment, the AC-to-DC voltage converter circuit 12 is shown to be disposed on one printed circuit board 54, but it may be arranged on a plurality of printed circuit boards.

Figure 4:
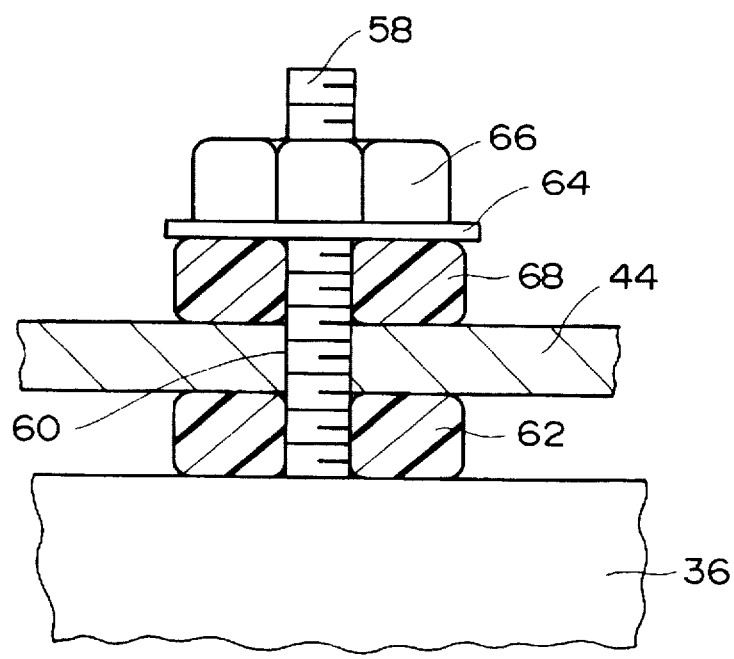
FIG. 4 is an enlarged view of part of the structure shown in FIG. 2 showing how an air compressor is secured to a partition wall.

The air compressor 36 is disposed in the lower region 48. The air compressor 36 is heavier than the AC-to-DC voltage converter circuit 12. A plurality of threaded bolts 58 extend from the upper surface of the air compressor 36. As shown being enlarged in FIG. 4, the threaded bolts 58 extend through their associated one of holes 60 formed to extend through the partition wall 44. In the upper region 46, a washer 64 is put on each of the bolts 58, and then, a nut 66 is screwed onto each of the bolts 58. By tightening the nuts 66 on the bolts 58, the air compressor 36 is supported, being suspended from the partition wall 44 within the lower region 48.

A shock absorber is disposed between the upper surface of the air compressor 36 and the lower surface of the partition wall 44. In the illustrated embodiments, the shock absorber includes a plurality of ring-shaped shock absorbing members 62. Each of the ring-shaped shock absorbing members 62 is disposed in such a manner that one of the bolts 58 extends through the hole in the ring of that shock absorbing member 62. The upper and lower surfaces of each shock absorbing member 62 are in contact with the partition wall 44 and the air compressor 36, respectively.

Similarly, a ring-shaped shock absorbing member 68 is disposed between each of the washers 64 and the partition wall 44. The bolts 58 extend through the holes in the associated ring-shaped shock absorbing members 68. The upper surfaces of the ring-shaped shock absorbing members 68 are in contact with the respective washers, and the lower surfaces of the ring-shaped shock absorbing members 68 are in contact with the partition wall 44.

The shock absorber or shock absorbing members 62 and 68 are made of an elastic material, e.g. synthetic rubber, e.g. chloroprene rubber.

The nuts 66 are screwed onto the respective bolts 58 with the shock absorbing members 62 and 68 disposed on the upper and lower surfaces of the partition wall 44, so that the air compressor 36 is supported in the lower region from the partition wall 44.

In the described embodiment, the AC-to-DC voltage converter circuit 12 is disposed in one of the two regions partitioned by the partition wall 44, and the air compressor 36 is disposed in the other region. The amount of heat generated by the AC-to-DC voltage converting circuit 12 is significantly different from the amount of heat generated by the air compressor 36. The heat generated by one of the AC-to-DC voltage converter circuit 12 and the air compressor 36 does not give influence to the heat generated by the other because the AC-to-DC voltage converter circuit 12 and the air compressor 36 are disposed separately in the two regions.

Since the air compressor 36 generates a lot of heat, it is preferable to cool it with a blower or fan which can supply a large amount of air. Also, it is preferable to cool the AC-to-DC voltage converter circuit 12 with a fan which provides a smaller amount of air since the AC-to-DC voltage converter circuit 12 generates less heat.

If the casing 38 were not divided into two regions and, therefore, the AC-to-DC voltage converter circuit 12 and the air compressor 36 were disposed in a single room, it would not be possible to cool them by appropriate amounts of air. However, according to the present invention, the AC-to-DC voltage converter circuit 12 and the air compressor 36 are disposed in separate regions, fans which can blow the AC-to-DC voltage converter circuit 12 and the air compressor 36 with appropriate amounts of air can be disposed in the respective regions.

Although the illustrated embodiment, the air compressor 36 is in the lower region 48, the air compressor 36 may be disposed in the upper region 46. However, because the air compressor 36 is heavy, it is desirable to disposed it in the lower region 48, so that the cutter can be set stable when it is operated.

The air compressor 36 may be disposed on the floor of the lower region 48. However, because the floor is provided by the legs of the U-shaped members 50 and 52 made of synthetic resin having relatively small strength, it may be necessary to additionally dispose a relatively strong supporting member on the floor. On the other hand, when hanging the air compressor 36 from the partition wall 44, no additional support member is required because the partition wall 44 is formed of a material, e.g. iron, which can bear the weight of the air compressor 36, and, therefore, the structure of the casing 38 is simple.

The air compressor 36 vibrates when operating. If the shock absorbing members 62 and 68 were not used, vibrations of the air compressor 36 would be transmitted to the printed circuit board 54 and electronic components mounted on it, which could cause cracks to be generated in solder connecting the electronic components to the printed circuit board 54. Vibrations of the air compressor 36 may further disconnect the connectors on the printed circuit board 54, which are used to connect the output terminals 18P and 18N on the front panel 40 to associated circuit points on the printed circuit board 54, from connectors to which cables for the output terminals 18P and 18N are connected.

According to the present invention, vibrations from the air compressor 36 are effectively absorbed by the shock absorbing members 62 disposed between the air compressor 36 and the partition wall 44 and by the shock absorbing members 68 disposed between the partition wall 44 and the washers 64. As a result, vibrations are not transmitted from the air compressor 36 to the printed circuit board 54, and electronic components and connectors on the printed circuit board 54.

The shock absorbing members 62 and 68 need not be disposed about the bolts 58. However, in the illustrated embodiment, because the shock absorbing members 62 and 68 are ring-shaped and they are disposed in such a manner that the bolts 58 extend through the holes in the rings, the mounting of the shock absorbing members is easy.

What is claimed is:

1. An air plasma arc cutter comprising:

a front panel;

a rear panel spaced from said front panel;

first and second U-shaped plastic members forming, together with said front and rear panels, a casing with a space therein;

a partition wall having high strength, said partition wall having two opposed edges coupled to said front and rear panels and dividing said space into a first region above said partition wall and a second region below said partition wall;

an AC-to-DC voltage converter disposed in said first region, for converting an AC voltage to a DC voltage to be applied between a torch electrode of a torch of said cutter and a workpiece to be cut by said cutter; and an air compressor disposed in said second region for supplying compressed air around said torch electrode;

said air compressor having a threaded bolt which extends through said partition wall from said second region into said first region;

wherein said cutter further comprises;

a nut screwed onto said bolt of said air compressor in said first region to thereby secure said air compressor to said partition wall;

a first shock absorber disposed between and in contact with said nut and said partition wall; and a second shock absorber disposed between and in contact with said air compressor and said partition wall.

2. The air plasma arc cutter according to claim 1 wherein said first and second shock absorbing members are disposed around said bolt.

3. The air plasma arc cutter according to claim 2 wherein said bolt extends through said first and second shock absorber.

* * * * *